United States Patent
Lang

[15] 3,684,346
[45] Aug. 15, 1972

[54] OPTICAL INTEGRATING SYSTEM

[72] Inventor: Paul Wentworth Lang, 31717 Foxfield Dr., Westlake Village, Calif. 91360

[22] Filed: Nov. 27, 1970

[21] Appl. No.: 93,150

[52] U.S. Cl. ............... 350/96 B, 350/161, 350/295
[51] Int. Cl. .............................................. G02b 5/16
[58] Field of Search....350/96 B, 96 R, 160, 161, 295

[56] References Cited

UNITED STATES PATENTS

| | | | |
|---|---|---|---|
| 3,459,466 | 8/1969 | Giordmaine | 350/160 |
| 3,299,368 | 1/1967 | Klebba | 350/161 X |

Primary Examiner—David H. Rubin
Attorney—Pastoriza & Kelly

[57] ABSTRACT

A system of integrating light over a given time period includes the directing of the light successively to a plurality of light receiving areas during the given time period in a given sequence. Light portions from the respective receiving areas are conducted to a common termination area. Optical delay means are provided to delay the conducted light portions by different amounts in such a manner that the portions arrive at the termination area substantially simultaneously so that an integrated light pulse of greater intensity than the original light results. The sequence of operations may be repeated at a high frequency to provide a series of high intensity light pulses.

1 Claim, 5 Drawing Figures

INVENTOR.
PAUL WENTWORTH LANG
BY Pastoriza & Kelly
ATTORNEYS

INVENTOR.
PAUL WENTWORTH LANG
BY Pastoriza & Kelly
ATTORNEYS

OPTICAL INTEGRATING SYSTEM

This invention relates generally to optical systems and more particularly, to a method and apparatus for integrating light of a given intensity to provide a pulse or pulses of light of substantially higher intensity.

BACKGROUND OF THE INVENTION

In the generation of high intensity light pulses such as for use in stroboscopes, camera electronic flash units and the like, it is known to store a substantial amount of electrical energy which is then converted into a high intensity light pulse usually through a discharge in a gas tube. In other systems, it is known to start with an initial pulse or series of pulses and simply amplify the pulses by means of light amplifiers. In the latter instance, external energy sources are necessary to operate the light amplifiers.

In both of the foregoing systems for providing high intensity light pulses, there is a serious limitation on the frequency at which such pulses may be generated. This limitation is imposed by the electrical energizing systems for providing a high voltage discharge or for operating the light amplifiers. In the former instance, finite time periods are required to charge capacitors with the necessary energy to provide a desired discharge.

It would be highly desirable if a system could be devised wherein a series of high intensity light pulses could be generated at an extraordinarily high frequency and without the limitations imposed by conventional electronic circuitry. Such a system would be extremely useful, for example, in high speed photography as well as in pulse code type communication systems in which a beam of light is the information media.

BRIEF DESCRIPTION OF THE PRESENT INVENTION

With the foregoing in mind, it is a primary object of the present invention to provide a unique method and apparatus for generating one or a series of high intensity light pulses without the limitations imposed by known electronic circuitry or known types of light amplifiers.

More particularly, the invention comprehends a system in which the desired high intensity light pulse is obtained from a continuous light source over a given period of time, the energy in the continuous light source over the period being "bunched" into a single integrated light pulse.

In accord with the method of the invention, a light beam is directed successively to a plurality of light receiving areas during a given time period in a given sequence. Light portions respectively received on the areas are then conducted to a common termination area or surface. Each of the light portions during its travel from the light receiving areas to the common termination area is delayed by a calculated amount such that the light portions arrive substantially simultaneously at the termination area resulting in the desired integrated high intensity light pulse.

The sequential directing of the light may be repeated for subsequent periods corresponding to the given period thereby providing a series of output high intensity integrated light pulses.

In accord with a preferred apparatus for carrying out the invention, a light source is collimated into a beam of light which in turn is successively directed to a plurality of light receiving areas defined, in the preferred embodiment, by the ends of light conductors of fiber optics. Delay of the light portions traveling through the respective fiber optics arrangements can be effected by adjusting the lengths of the fiber optics' paths or alternatively by passing the light portions through light conductors in which the velocity of the light is slowed. In either event, the light portions will arrive simultaneously at the termination or other ends of the fiber optics to provide the desired integrated light pulse.

BRIEF DESCRIPTION OF THE DRAWINGS

A better understanding of the method and apparatus of the invention will be had by referring to the accompanying drawings, in which.

DETAILED DESCRIPTION OF THE PREFERRED EMBODIMENT

Figure 1:
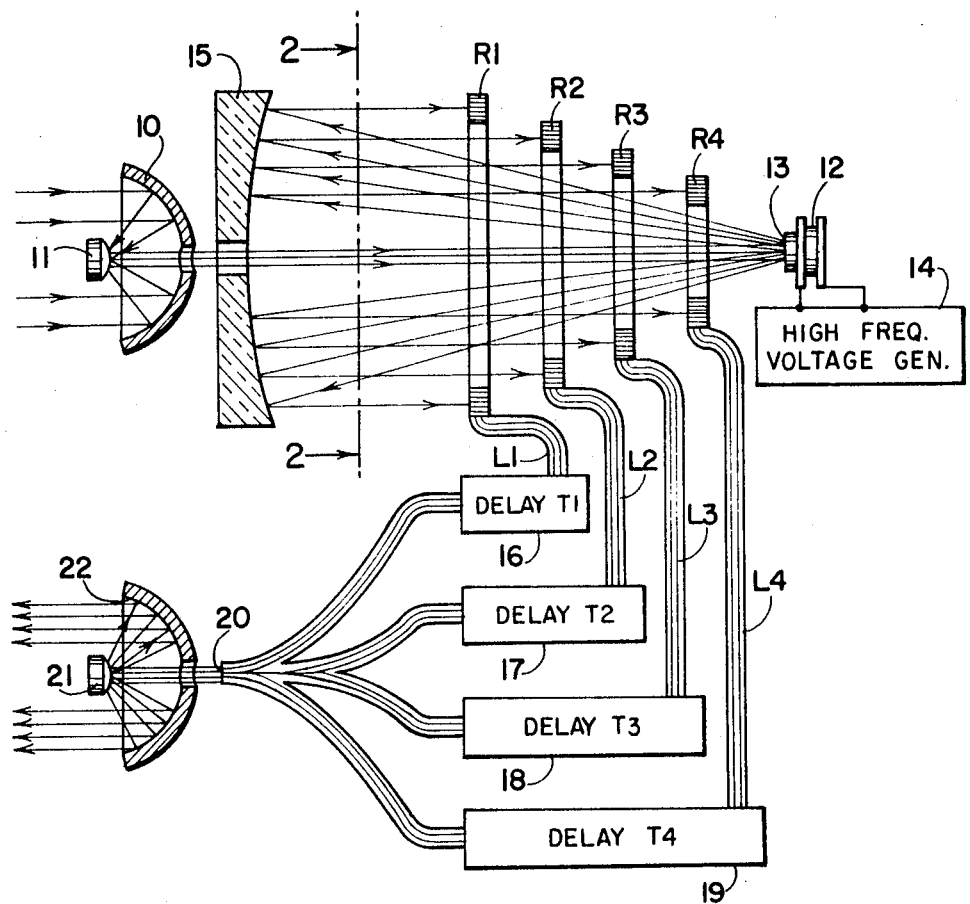
FIG. 1 is a schematic showing partly in block form of the basic components making up an apparatus for carrying out the method of the invention.

Referring first to FIG. 1, there is shown in the upper left hand portion of the drawing, a light collimating system in the form of a concave reflector 10 for directing incoming light to a secondary mirror 11 disposed at the focus of the mirror 10. As shown, the mirror 10 is apertured at its center such that the collected light can pass from the secondary mirror 11 through the aperture in the form of a collimated beam of circular cross section.

A light directing means includes an X-cut piezoelectric crystal 12 having a mirrored surface 13 disposed to intercept the beam of light from the collimating apparatus 10 and 11. An electric field generating means, preferably in the form of a high frequency voltage generator 14 is coupled by means of electrodes to pass an electric field through the crystal 12 in the direction of the piezoelectric axis. This axis corresponds with the axis of the light beam and is normal to the plane of the mirrored surface 13 in the absence of any distortion of the crystal 12.

Piezoelectric crystals are characterized in that they can be physically distorted in response to an applied electric field. The crystal 12 which, for example, may comprise quartz is caused to distort upon application of an electric field in such a manner as to vary the curvature of the mirrored surface 13. As a result, the direction of the reflected beam of light intercepted by the mirrored surface can be changed through successive spatial positions.

Thus, still referring to FIG. 1, there is indicated by the arrows the reflected light from the mirrored surface 13 striking a large reflector 15. The reflector 15 directs the light towards a plurality of light receiving means in the form of rings of fiber optics R1, R2, R3 and R4. The rings are coaxially positioned and axially spaced with successively smaller radii such that the front annular surfaces of the rings constitute receiving areas for light reflected from the reflector 15.

Optically coupled to each of the light receiving means are optical delay devices 16, 17, 18 and 19. The optical coupling may simply constitute a continuation of the fiber optics from each ring in the form of a flexible cord or cable as indicated by the lines L1, L2, L3 and L4. The other ends of the delay devices connect through light conductors which may also be fiber optics which converge to a common termination surface 20. A light projection device including a primary mirror 21 and secondary reflector 22 is shown coupled to receive light from the common termination surface 20 so that the light may be directed by the projection system as desired.

Figure 2:
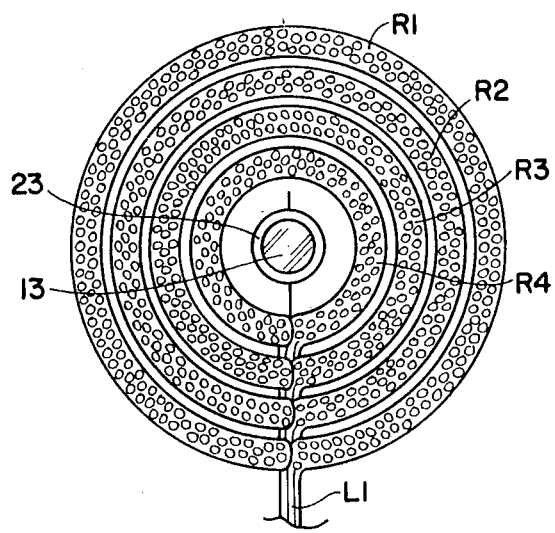
FIG. 2 is a front elevation view of a portion of the apparatus taken in the direction of the arrows 2—2 of FIG. 1.

FIG. 2 illustrates the light receiving areas defined by the fiber optics rings R1, R2, R3 and R4, the ends of the individual fibers forming the optical conductors facing in the direction of light received from the reflector 15 of FIG. 1.

Figure 3:
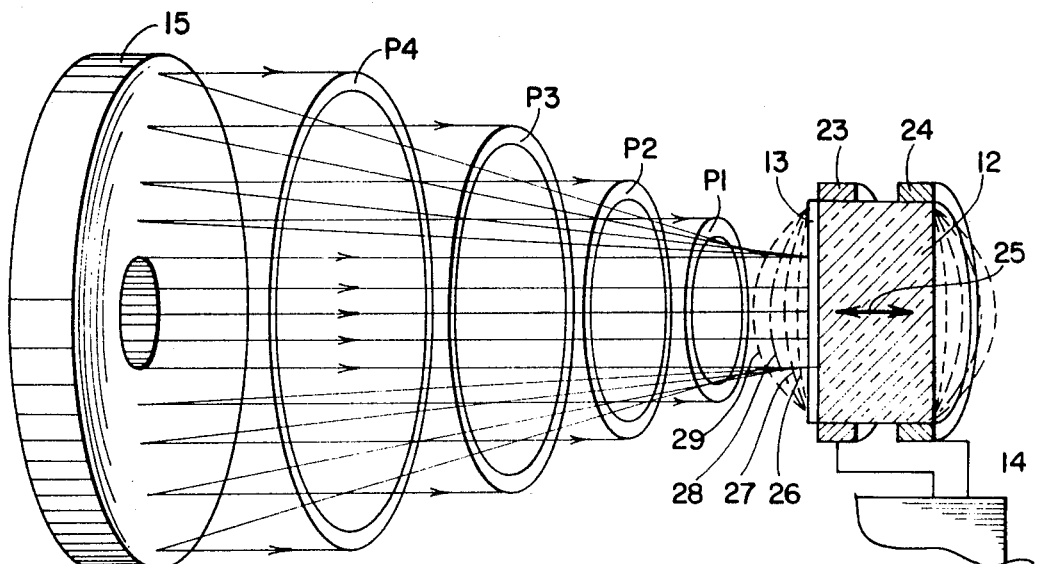
FIG. 3 is an enlarged schematic perspective view of a portion of the apparatus of FIG. 1 useful in explaining the method of the invention.

FIG. 3 illustrates more clearly the manner in which light portions are generated and received in the respective light receiving means. Thus, in the particular arrangement described in FIG. 1, the electric field generating means 14 includes electrodes 23 and 24 in the form of coaxial rings positioned about the front and rear annular marginal edges of the crystal 12 as illustrated so that the electric field passes through the crystal as indicated by the double headed arrow 25. As the intensity of the electric field is varied, the physical distortion of the crystal 12 will also vary, the geometry being designed such that the curvature of the mirrored surface 13 is progressively made more convex with increasing electric field strength. Successive positions of this mirrored surface are shown in exaggerated form by the dashed lines 26, 27, 28 and 29. This type of distortion of the mirror will cause the reflected beam striking the mirror to assume the form of a circle of light which circle of light will increase in radius as the mirror becomes more convex.

Thus, as illustrated in FIG. 3 when only a small amount of distortion occurs, the initial light beam is directed along D1 and reflected at P1. As the convexity of the mirrored surface increases, the beam is successively spatially directed as indicated at D2, D3 and D4 to generate successive rings of light of progressively larger radii. These rings are reflected by the mirror 15 such as indicated by the light portions P2, P3, and P4. Thus, portions of the continuously expanding ring of light will be respectively received in the fiber optics rings R4, R3, R2 and R1, respectively, as described in FIGS. 1 and 2.

Figure 4:
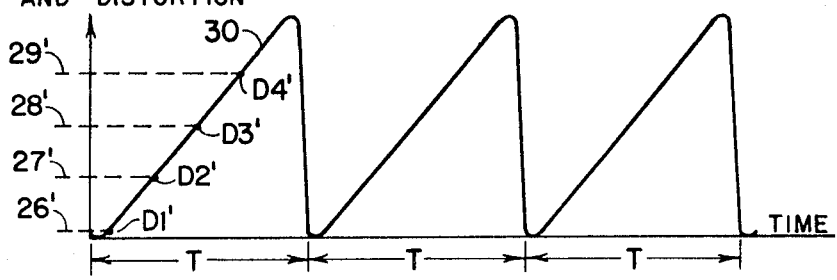
FIG. 4 is a qualitative plot illustrative of the operation of the structure of FIG. 3.

FIG. 4 illustrates at 30 a saw tooth pattern as one example of the type of electric field of variation that might be applied to the crystal 12 of FIG. 3. Since the distortion of the crystal itself is proportional to the electrical field strength, the ordinate values of the pattern 30 over a given time period T may be used to define the change in direction of the reflected light beam. Thus, at the ordinate levels 26', 27', 28' and 29' the reflected beam is directed towards the mirror 15 in direction D1', D2', D3' and D4' to result in the generation of the expanding light ring which successively assumes positions indicated by P1, P2, P3 and P4 in FIG. 3. The generation process is repeated periodically if the saw tooth pattern is repeated as indicated in FIG. 4.

Figure 5:
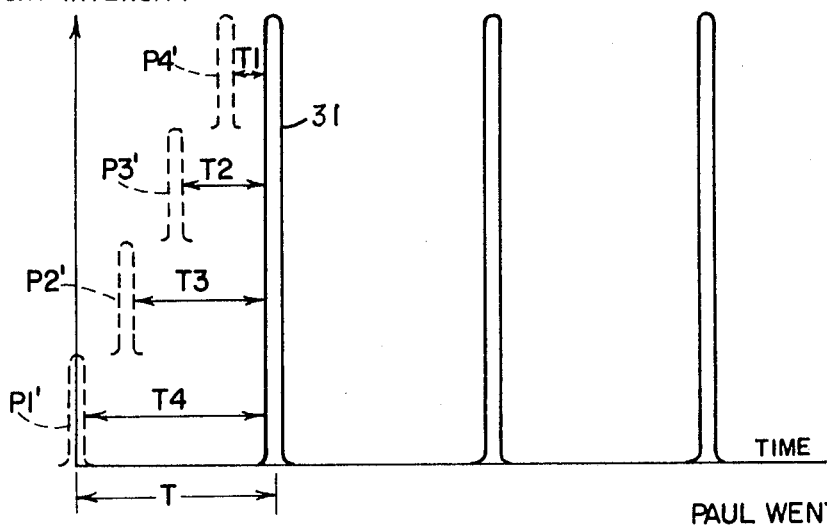
FIG. 5, illustrates a series of high intensity light pulses provided in accord with the invention.

FIG. 5 illustrates at P1', P2', P3' and P4' dotted line pulses corresponding to light portions respectively received in the annular receiving end surfaces of the fiber optics making up the rings R4, R3, R2 and R1 of FIGS. 1 and 2. As indicated in FIG. 5, these light portions are respectively delayed in a reverse manner such that the light portion P1' which is initially generated is delayed by a calculated time indicated at T4, the successively generated light portions P2', P3' and P4' being delayed by successively less amounts as indicated at T3, T2, and T1. The arrangement is such that all of the light portions will arrive at the termination surface 20 of FIG. 1 at substantially the same time to provide a high intensity integrated light pulse indicated at 31 in FIG. 5. A series of such light pulses as indicated, will be provided when the saw tooth pattern of FIG. 4 is repeated.

OPERATION

The operation of the invention will be evident from the foregoing description. The electric field generating circuit 14 may be adjusted to generate a wave form such as shown in FIG. 4 at any desired frequency up to the limit of the capabilities of the crystal 12 to distort. At the particular frequencies selected, there will be defined a time period T as shown in FIG. 4. With a saw tooth wave form provided, the crystal 12 will distort in a manner following the pattern 30 of FIG. 4 with the result that a collimated light beam from the collimating optics 10 and 11 of FIG. 1 will be reflected in the form of a ring of light the radius of which will increase as a function of the slope of the saw tooth wave. This expanding ring of light will be reflected by the reflector 15 and successively be received on the light receiving areas defined by the rings of fiber optics shown in FIG. 1 at R4, R3, R2 and R1.

The successive portions of light in the respective fiber optics will pass through the optical delay means, the first received light portion from the ring R4 being delayed the longest period of time as indicated in FIG. 5 and the last received light portion in the ring R1 being delayed the least amount of time. The delays, as noted heretofore, are adjusted such that all of the light portions in the respective rings will arrive at the termination surface 20 of FIG. 1 substantially simultaneously to provide a high intensity integrated light pulse as shown at 31 in FIG. 5. This light pulse, of course, will be repeated at a frequency corresponding to the frequency of the saw tooth wave form of FIG. 4. It will be evident that the intensity of each of the light pulses is substantially greater than the intensity of the collimated beam of light striking the mirrored surface of the crystal. In one sense, therefore, a light amplification has been achieved in a passive manner; that is, without the introduction of any outside energy.

Piezoelectric type crystals are known that can be distorted at a frequency of up to 10 to 20 megacycles. It will be appreciated, accordingly, that an extraordinarily high frequency of light pulses can be generated by the system of the present invention. When operated at extremely high frequencies, the optical delay devices may be designed to provide the calculated delay time by simply increasing the path lengths of the fiber optics between the corresponding light receiving area and termination surface.

As a specific example, if the frequency is taken as 10mc, the period T will be equal to $10^{-7}$ sec. Taking the speed of light as approximately $3 \times 10^{10}$ cm. per sec. through the fiber optics, the length of the fiber optics to obtain the maximum delay time T4, which would correspond to the period T, would be $3 \times 10^{10} \times 10^{-7}$ which equals 3,000 centimeters or about 30 meters. If the crystal is operated at twice the frequency, this length diminishes to about 15 meters and if the fiber optics selected is such that the speed of light is less than $3 \times 10^{10}$ cm. per sec. which represents the maximum speed of light, the distance would be less than 15 meters and thus the delay can be as a practical metter incorporated in a relatively small area by coiling the fiber optics.

For longer timer periods T, longer paths would be required and in this respect, mirrors could be used to channel the light back and forth over given distances. Alternatively, the required delays could be introduced by passing the light through suitable light conducting mediums in which the speed of light is substantially less than its speed in vacuum.

It should also be understood that the crystal 12 could be pulsed by a single saw tooth wave form at any desired time intervals, perhaps separated by as much as 1 second. So long as the slope of the saw tooth is sufficiently steep so that the period T of FIG. 4 remains sufficiently short to permit the delays to function properly, the generation of integrated light pulses can be realized. The upper limit of the repetition rate or frequency would be defined by the reciprocal of the time period T. Thus, the invention would be most useful as a stroboscopic light or as a flash unit for photography purposes.

While the invention has been described with respect to a specific apparatus for carrying out the method, it should be understood that equivalent results can be achieved by utilizing equivalent optical components. As one example, a series of annularly shaped stepped mirrors could be provided in place of the rings of fiber optics and a series of further mirrors properly positioned to serve as light conductors to a common termination point. Further, while only four receiving rings have been shown to simplify the drawings and description of the theory, the actual embodiment of the invention would preferably include ten such rings. The invention, accordingly, is not to be thought of as limited to the specific example set forth for illustrative purposes.

What is claimed is:

1. An optical integrating system for integrating light comprising, in combination:
   a. a light collimating means for providing a light beam of circular cross section;
   b. a piezoelectric crystal having a mirrored surface positioned to intercept and reflect said light beam;
   c. electric field generating means coupled to said crystal to pass an electric field therethrough in a direction to cause distortion of said crystal in a manner to vary the curvature of said mirrored surface such that the reflected light beam takes the form of a ring of light of increasing radius as the distortion increases;
   d. a plurality of rings of fiber optics of varying radii coaxially positioned to define annular receiving areas;
   e. a concave reflector coaxial with said ring of light to direct said ring of light towards said receiving areas such that successive annular receiving are as intercept said ring of light as its radius increases;
   f. a plurality of optical delay means respectively coupled to said annular receiving areas;
   g. a common termination surface optically coupled to said optical delay means, each of said plurality of optical means delaying the light portions successively intercepted by said annular receiving areas by a calculated amount of time such that the successive light portions arrive at said common termination surface substantially simultaneously to thereby provide an integrated pulse of light of greater intensity than the intensity of said original light beam; and
   h. an optical projection device for receiving and projecting said integrated pulse of light from said termination surface, said electric field generating means providing an electric field variation in a repetitive manner at high frequency to thereby provide a series of integrated light pulses for projection from said termination surface.

* * * * *

UNITED STATES PATENT OFFICE
CERTIFICATE OF CORRECTION

Patent No. 3,684,346  Dated August 15, 1972

Inventor(s) Paul Wentworth Lang

It is certified that error appears in the above-identified patent and that said Letters Patent are hereby corrected as shown below:

On the title page, between the designations of Inventor and Filed, insert:

Assignee: 1/2 interest to Michael H. duPont

Signed and sealed this 23rd day of January 1973.

(SEAL)
Attest:

EDWARD M. FLETCHER, JR.
Attesting Officer

ROBERT GOTTSCHALK
Commissioner of Patents